US011126006B2

(12) United States Patent
Doucet (10) Patent No.: US 11,126,006 B2
(45) Date of Patent: Sep. 21, 2021

(54) OPTICAL COMPONENT FOR TRANSFORMING A GAUSSIAN LIGHT BEAM INTO A LIGHT SHEET

(71) Applicant: Institut National D'Optique, Quebec (CA)

(72) Inventor: Michel Doucet, Quebec (CA)

(73) Assignee: Institut National D'Optique, Quebec (CA)

(*) Notice: Subject to any disclaimer, the term of this patent is extended or adjusted under 35 U.S.C. 154(b) by 392 days.

(21) Appl. No.: 15/833,726

(22) Filed: Dec. 6, 2017

(65) Prior Publication Data

US 2019/0171025 A1    Jun. 6, 2019

(51) Int. Cl.
 *G02B 27/09*  (2006.01)
(52) U.S. Cl.
 CPC ..... *G02B 27/0927* (2013.01); *G02B 27/0983* (2013.01)
(58) Field of Classification Search
 CPC ............ G02B 27/0927; G02B 27/0983; G02B 27/0977; G02B 17/061; G02B 17/086; G02B 5/001; G02B 27/0172; G02B 19/0057; G02B 5/0284; G02B 26/08; G02B 6/0008; G02B 27/0012; G02B 6/0048; G02B 6/0096; H04N 5/7441; H04N 9/3105; F21V 5/04
 USPC ........................................................ 359/858
 See application file for complete search history.

(56) References Cited

U.S. PATENT DOCUMENTS

| 4,641,920 A * | 2/1987 | Matsuoka .............. G02B 27/09 359/245 |
| 6,539,638 B1 | 4/2003 | Pelletier |
| 6,801,368 B2 * | 10/2004 | Coufal ................... G02B 13/18 359/708 |
| 6,867,929 B2 * | 3/2005 | Lopez-Hernandez ...................... G02B 5/0278 250/503.1 |
| 7,328,516 B2 | 2/2008 | Nash et al. |

(Continued)

OTHER PUBLICATIONS

Marani et al., "A Compact 3D Omnidirectional Range Sensor of High Resolution for Robust Reconstruction of Environments", Sensors, 2015, 15, pp. 2283-2308.

(Continued)

*Primary Examiner* — Stephone B Allen
*Assistant Examiner* — Rahman Abdur
(74) *Attorney, Agent, or Firm* — Crowell & Moring LLP (57) ABSTRACT

An optical component for transforming an input light beam having a Gaussian irradiance distribution into an output light sheet is provided. The optical component includes a first reflective surface extending around the central optical axis of the optical component and across an input light path of the input light beam, and reflects input light rays into transitional light rays defining a transitional light cone. A second reflective surface extends around the central optical axis and across a light path of the transitional light cone, reflecting the transitional light rays outwardly into output light rays defining the output light sheet. The first and second reflective surfaces are configured to distribute optical power within the output light sheet according to a Gaussian irradiance distribution transversally to the output light sheet. The output light sheet may be planar or conical.

23 Claims, 7 Drawing Sheets

(56) References Cited

U.S. PATENT DOCUMENTS

| | | | |
|---|---|---|---|
| 2006/0274439 A1* | 12/2006 | Gordon | G02B 17/061 |
| | | | 359/859 |
| 2013/0010279 A1* | 1/2013 | Aiko | G01S 7/481 |
| | | | 356/4.01 |
| 2015/0117011 A1 | 4/2015 | Wu et al. | |
| 2015/0346582 A1 | 12/2015 | Aikio et al. | |
| 2016/0223801 A1* | 8/2016 | Kiontke | G02B 17/0808 |
| 2017/0184865 A1* | 6/2017 | Doucet | G02B 26/0816 |
| 2019/0155007 A1* | 5/2019 | Steever | G02B 17/086 |

OTHER PUBLICATIONS

VTT, "Omnidirectional lens captures 360 degree panoramic view", 2016, pp. 1-4.

Hofmann et al., "Resonant biaxial 7-mm MEMS mirror for omnidirectional scanning", Journal of Micro/nanolithography, MEMS, and MOEMS, 2013, vol. 13, Issue 1.

Aikio, "Omnidirectional Lenses for Low Cost Laser Scanners", Minifaros, AMAA 2011, 18 pages.

Zemax, "Finnish optical design team uses Zemax software to create first-ever 360 degree view omnidirectional lens", 2016, http://zemax.jp/get-technical-assistance/customer-stories/omnidirectional-lens.

* cited by examiner

OPTICAL COMPONENT FOR TRANSFORMING A GAUSSIAN LIGHT BEAM INTO A LIGHT SHEET

TECHNICAL FIELD

The present description generally relates to light transformation and more particularly concerns an optical component which can transform a Gaussian light beam into a light sheet of radially distributed rays.

BACKGROUND

Some applications require that an annulus or a sheet of light be projected on objects. An example of such applications is the inspection of tubular structures using optical triangulation methods. Typically, a thin cone of light is generated from a laser beam using a special optical element or assembly such as a scanning mirror, a diffractive element, or an axicon. The inspection system is inserted inside the tubular structure and projects an optical beam that forms a somewhat deformed elliptical ring of light on the inner wall of the tubular structure. The anomalies in the light pattern reflected by the wall of the tubular structure depend on how the cross-sectional shape of the tubular structure differs from a perfect circle. The capture of the reflected light pattern with the camera of the inspection system and its processing with dedicated algorithms allow the characterization of the cross-sectional shape of a section of the tubular structure along with the detection of small-sized features such as cracks and openings. Combining a plurality of measurements made repeatedly along the length of the tubular structure can provide a mapping of the entire structure. The concept may be generalized to the mapping of the interior of any closed form, for example rooms and corridors of a building. Indeed, important applications may be derived from the three-dimensional (3D) characterizations of building interiors such as autonomous navigation or for the monitoring of movements in a room.

The precision of laser triangulation techniques relies on the ability of the system to identify a specific position within the transverse irradiance distribution of the probing laser light. In a conventional laser beam-based triangulation system, the laser spot produced on the observed object presents either a one-dimensional (1D) or two-dimensional (2D) Gaussian irradiance distribution that is preserved along the laser propagation axis. This preservation in the shape of the irradiance distribution contributes to the achievement of reliable measurements over a broad range of object positions. By contrast, the cones of light generated with existing methods generally fail to provide such a well-defined irradiance distribution. Diffractive optical elements approximate an illumination cone by the superimposition of a plurality of Gaussian beams and thus produce a dot pattern instead of a continuous ring-like pattern. The illumination cone produced by an axicon presents a radial section that is highly off-centered, which makes difficult the achievement of precise measurements. Scanning devices can produce illumination patterns of high quality, but with the main disadvantage of expensive and bulky moving parts.

There remains a need for a means allowing the generation of a sheet of light overcoming at least some of the drawbacks of the prior art.

SUMMARY

In accordance with one aspect, there is provided an optical component for transforming an input light beam having a Gaussian irradiance distribution into an output light sheet. The optical component has an input light path defining a central optical axis and configured for propagation of the input light beam therealong. A first reflective surface extends around the central optical axis and across the input light path so as to reflect input light rays of the input light beam into transitional light rays defining a transitional light cone. A second reflective surface extends around the central optical axis and across a light path of the transitional light cone so as to reflect the transitional light rays outwardly into output light rays defining the output light sheet. The first and second reflective surfaces are configured to distribute optical power within the output light sheet according to a Gaussian irradiance distribution transversally to the output light sheet.

In some implementations, each of the first and second reflective surfaces has a shape defined by a two-dimensional (2D) profile in a plane including the central optical axis and a symmetry of revolution about this central optical axis. The 2D profiles of the first and second reflective surfaces preferably stem from a modeling of the trajectories of the input, transitional and output light rays through the optical component.

In some implementations, the 2D profiles of the first and second reflective surfaces stem from analytical or numerical solutions to differential equations relating the 2D profiles to trajectories of the input, transitional and output light rays through the optical component. In other variants, the 2D profiles of the first and second reflective surfaces stem from solutions, obtained through an optimization process, to parametric equations relating said 2D profiles to trajectories of the input, transitional and output light rays through the optical component.

The first reflective surface may have an apodizing reflectivity profile.

In some implementations, the output light sheet projects perpendicularly to the central optical axis. In other implementations, the output light sheet projects at a non-normal angle with respect to the central optical axis.

In some implementations, the optical component includes an optical structure having a proximal portion and a distal portion opposite the proximal portion. The first reflective surface extends across the distal portion facing towards the proximal portion, and the second reflective surface extends across the proximal portion facing towards the distal portion.

In some variants, the optical structure may include a hollow tube which includes the proximal and distal portions and has a longitudinal channel defining the input light path. A first optical element extends inside the longitudinal channel in the distal portion of the hollow tube, the first optical element having an inward face defining the first reflective surface. A second optical element extends inside the longitudinal channel in the proximal portion of the hollow tube, the second optical element having an inward face defining the second reflective surface. The second optical element further has a transparent central area along the input light path. The first and second optical elements may be mirrors.

In other variants, the optical structure may include a solid cylinder made of a transparent material. The input light path extends longitudinally through this solid cylinder, the solid cylinder having a lateral wall traversed by the output light sheet. The proximal and distal portions may correspond to opposite longitudinal ends of the solid cylinder. In some embodiments, the distal portion forms a first cavity having a first cavity wall, and the proximal portion forms a second cavity having a second cavity wall. A first layer of reflective material is provided along the first cavity wall and defines the first reflecting surface. A second layer of reflective material is provided along the second cavity wall and defines the second reflecting surface. The second layer of reflective material forms a ring around the input light path. The lateral wall of the solid cylinder may be cylindrically or frustro-conically shaped. In some variants, the lateral wall of the solid cylinder extends at a right angle with respect to the output light rays of the output light sheet. In other variants, the lateral wall of the solid cylinder extends at a non-normal angle with respect to the output light rays of the output light sheet. Preferably, the non-normal angle is selected so that the output light rays are redirected along a propagation direction perpendicular to the central optical axis by refraction at the through the lateral wall.

In accordance with another aspect, there is provided an optical component for transforming an input light beam having a Gaussian irradiance distribution into an output light sheet. The optical component has an input light path defining a central optical axis and configured for propagation of the input light beam therealong. A first reflective surface extends around the central optical axis and across the input light path so as to reflect input light rays of the input light beam into transitional light rays defining a transitional light cone. A second reflective surface extends around the central optical axis and across a first light path of the transitional light rays so as to reflect the transitional light rays along a second light path projecting concentrically to the input light beam and clear of the first reflective surface. A third reflective surface extends around the central axis and across the second light path of the transitional light rays so as to reflect the transitional light rays outwardly into output light rays defining the output light sheet. The first and second reflective surfaces are configured to distribute optical power within the output light sheet according to a Gaussian irradiance distribution along a direction transversal to the output light sheet.

In some implementations, the optical component includes an input optical structure having a proximal portion and a distal portion opposite to the proximal portion. The first reflective surface extends across the distal portion facing towards the proximal portion, and the second reflective surface extending across the proximal portion facing towards the distal portion. The optical component further includes an output optical structure supporting the third reflective surface and affixed to the distal portion of the input optical structure. The input and output optical structures may for example be embodied by monolithic transparent blocks.

In accordance with yet another aspect, there is provided an optical component for transforming an input light beam having a Gaussian irradiance distribution into an output light sheet The optical component includes an input light path defining a central optical axis and configured for propagation of the input light beam therealong. A first reflective surface extends around the central optical axis and across the input light path so as to reflect input light rays of the input light beam into transitional light rays that cross the central optical axis. A second reflective surface extends around the central optical axis and across a light path of the transitional light rays so as to reflect the transitional light rays outwardly into output light rays defining the output light sheet. The first and second reflective surfaces are configured to distribute optical power within the output light sheet according to a Gaussian irradiance distribution transversally to the output light sheet.

Other features and advantages of the invention will be better understood upon reading of embodiments thereof with reference to the appended drawings.

DETAILED DESCRIPTION

The present description generally concerns embodiments of an optical component for transforming an input light beam having a Gaussian irradiance distribution into an output light sheet.

Implementations of the present optical component may provide an annulus-shaped output light sheet forming a fan of radially spreading rays of light projecting over 360° along a plane, that is, the light sheet projects perpendicularly to the central axis of the optical component. In other implementations, the output light sheet may be cone-shaped, or in other words the light sheet projects at a non-normal angle with respect to the central axis. In either case, the output light sheet preferably has a small thickness in a direction perpendicular to the propagation direction of the light rays, that is, along the local normal to the output sheet. The small thickness may, for example, be of the order of few hundreds of microns up to few millimeters. As mentioned above, some applications require a sheet of light such as an annulus or a cone to be projected on an object, such as for example the inspection of tubular structures using an optical triangulation method or the mapping of an enclosed space such as a room or corridor of a building. It will however be readily understood that embodiments of the optical component described herein may be used in a variety of other contexts.

The input light beam may be generated by a laser or other light source, and may be coherent or have a small étendue. The input light beam is preferably a collimated beam of light, or in other words, composed of parallelly propagating rays. One skilled in the art would readily understand that the reference to a collimated beam does not imply perfect parallelism of the propagating rays and that practical devices can support slight discrepancies in collimation of a light beam while still being considered within the scope of the expression "collimated". As known to those skilled in the art, the reference to the Gaussian irradiance distribution of the light beam of to a "Gaussian light beam" for short describes the relative irradiance of the beam in a plane perpendicular to the direction of propagation of the input light beam, the power of the central ray being maximum and the power of neighboring rays diminishing progressively outwardly along the cross-section of the beam according to a Gaussian curve. In the context of the present description, the Gaussian irradiance distribution is two-dimensional and rotationally-symmetric about the central axis. As known to those skilled in the art, several laser devices inherently provide light beams having a Gaussian irradiance distribution. For example, most conventional gas lasers (HeNe, Argon, etc. . . . ), circularized monomode laser diodes, laser diodes pigtailed in singlemode fibers, most optically-pumped solid state lasers (Ruby, Nd:YAG, etc. . . . ) and monomode fiber lasers emit optical beams having an irradiance profile closely approximating a $TEM_{00}$ Gaussian profile. Pigtailed superluminescent diodes may also emit optical beams having an irradiance profiles similar to a Gaussian profile. In other variants, laser beams having a non-Gaussian irradiance distribution may be modified prior to entering the optical component described herein so as to have the desired input profile.

In some implementations, the optical component described herein may be provided in conjunction with the light source generating the input light beam. The light source and optical component may be subcomponents of an optical device or system such as a triangulation-based conduit inspection system. In other variants, the optical component may be provided separately from the light source generating the input light beam and from ancillary devices or components.

Figure 1:
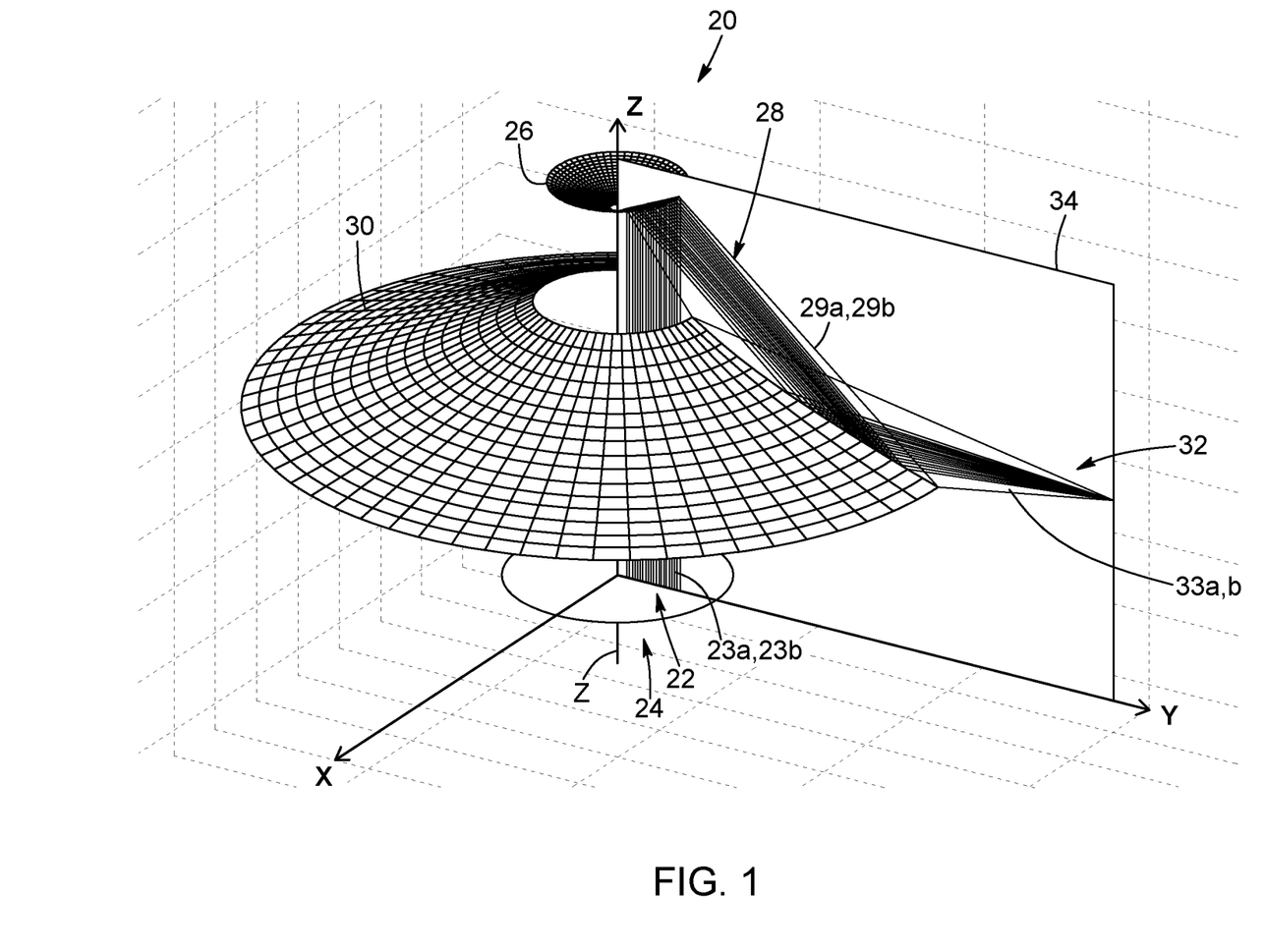
FIG. 1 is a schematized 3D representation of the configuration of an optical component for transforming an input light beam having a Gaussian irradiance distribution into an output light sheet according to an embodiment.

Referring to FIG. 1, an optical component 20 according to one possible configuration is schematically illustrated. The optical component 20 receives an input light beam 22 composed of light rays 23a, 23b, having a Gaussian irradiance distribution as explained above, and transforms this input light beam 22 into an output light sheet 32. In this embodiment, the output light sheet 32 forms an annulus of light rays spreading radially over 360°. The optical component 20 is configured so that it has an input light path 24 defining a central optical axis, designated by convention as the z axis for ease of reference, along which the input light beam 22 is received and propagates. Only a few light rays with trajectories all located in a same radial plane are shown on FIG. 1 to help visualize the geometry of the illustrated configuration.

The optical component 20 further includes a first and a second reflective surface 26 and 30. The first reflective surface 26 extends across the input light path 24 so as to intersect at least partially the input light beam 22, and to reflect at least some of the light rays 23a, 23b, of the input light beam 22 so as to form a transitional light cone 28. The transitional light cone 28 has light rays 29a, 29b, incident on the second reflective surface 30. The surface 30 extends around the central optical axis z so as to reflect the transitional light rays 29a, 29b, outwardly so as to form the output light sheet 32, having here defined an annulus of output light rays 33a, 33b, spread all around the optical axis z.

Each of the first and second reflective surfaces 26 and 30 has a shape defined by a 2D profile in a plane including the central optical axis, and a symmetry of revolution about said central optical axis. In other words, each of the first and second reflective surfaces 26 and 30 defines a surface of revolution about the central optical axis z. As is well understood by those skilled in the art, the expression "surface of revolution" is a term commonly used in mathematics to designate a surface in the Euclidean space which corresponds to the rotation of a curve (the generatrix) around an axis of rotation. This expression refers to a static surface and is not associated with the physical rotation of an object.

The first and second reflective surfaces 26 and 30 are configured to distribute optical power within the output light sheet 32 according to a Gaussian irradiance distribution along a direction transversal to the output light sheet. In accordance with one implementation, the shapes of the first and second reflective surfaces 26 and 30 may be designed using an approach hereinafter referred to as "Generic Ray Tracing" or GRT. In the GRT approach, the trajectories of the light rays into an optical system are expressed in terms of implicit functions that describe the optical surfaces encountered by the light rays, and their derivatives. The approach thus lends itself to the use of differential equations that may be solved numerically or analytically.

The Generic Ray Tracing approach can be conceptualized to describe a system reduced to a 2D geometry, and the 2D formalism may be generalized to more complex and more general cases with full 3D geometry. Advantageously, in the embodiments described herein, considering the symmetry of revolution of the reflective surfaces 26 and 30 and the collimation of the input beam 22, the trajectories of a bunch of light rays initially contained in a same radial plane 34, i.e. a plane that includes the system optical axis z, remain in this plane throughout their propagation within the optical component 20. Hence, the tracing of a specific ray in the 3D system is reduced to a 2D geometric problem confined to a radial plane 34. It follows from this observation that the general 3D ray tracing can be reduced to a 2D ray tracing and a coordinate rotation around the optical axis z. A 2D GRT approach can thus be used for the computation of the profiles of the first and second surfaces 26 and 30.

Use of GRT to Calculate the Profiles of the First and Second Reflective Surfaces In some implementations, the 2D profiles of the first and second reflective surfaces stem from a modeling of the trajectories of the input, transitional and output light rays through the optical component 20.

In one variant, the 2D profiles of the first and second reflective surfaces stem from analytical or numerical solutions to differential equations relating these 2D profiles to the trajectories of the input, transitional and output light rays through the optical component. As one skilled in the art will readily understand, various techniques are well known in the art to manufacture surfaces having a mathematically defined profile. It will be readily understood that the approach and design described below are provided by way of example only and that other profile design methods may be used without departing from the scope of the invention.

Figure 2:
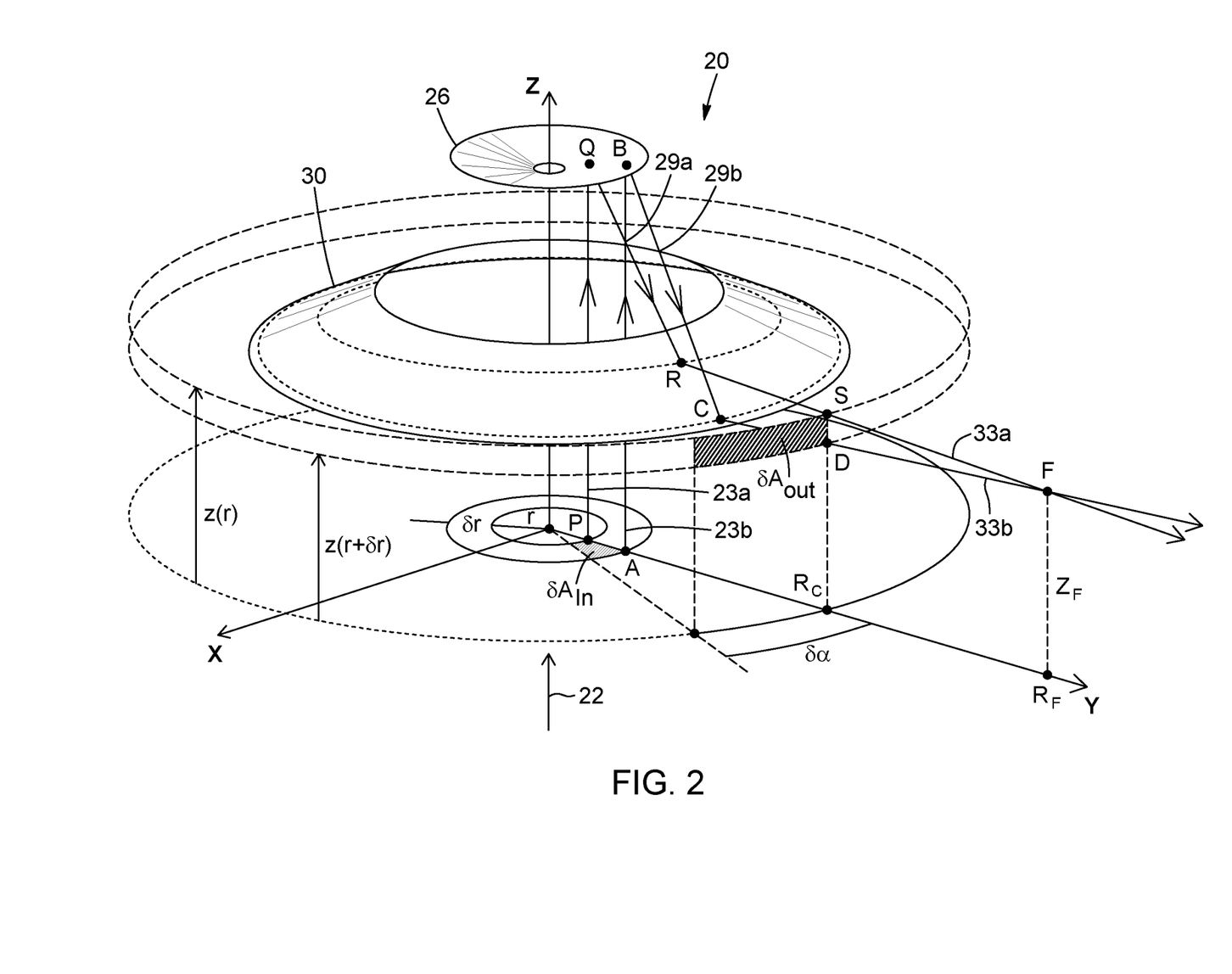
FIG. 2 schematically represents the geometry used for determining the profiles of the first and second reflective surfaces of the optical component of FIG. 1.

The basic geometry describing the optical component 20 and its principle of operation according to one example are shown on FIG. 2. For a collimated input beam 22 having a radial irradiance distribution, the use of cylindrical coordinates such as shown on FIG. 2 may be advantageous for the computation of the input/output ray mapping. Two arbitrary input rays 23a and 23b are traced on the figure, respectively passing by points P and A located on the y axis at radial coordinates r and r+δr. Considering the symmetry and since all the input rays 23a, 23b, are parallel to the z axis, the trajectories of the two rays 23a, 23b are entirely contained in the same radial plane i.e. the yz plane according to the frame of reference used on FIG. 2. The input light rays 23a, 23b are respectively reflected on points Q and B of the first reflective surface 26 into transitional light rays 29a, 29b. The transitional light rays 29a, 29b are then respectively reflected on points R and C of the second reflective surface 30 into output light rays 33a, 33b. The output light rays 33a, 33b intersect a cylinder of reference having semi-diameter Re at points S and D respectively, and converge to a focus point F located at the radial coordinate RF and height $z_F$. All the rays contained within a given radial plane converge at a point located at radial distance RF and height $z_F$ within the same plane, hence the focus of the optical element 20 is a circle with half-diameter RF located on the plane $z=z_F$.

On FIG. 2, the element area $\delta A_{In}$ confined in the input space by two radial planes (the plane defined as yz in the figure and the radial plane making an angle $\delta\alpha$ with respect to the yz plane) and two circles (respectively with radius r and r+$\delta$r) is mapped into the element area $\delta A_{Out}$ in the reference cylinder with half-diameter $R_C$. The element $\delta A_{Out}$ is also delimited by the same two radial planes defining $\delta A_{In}$, due to the symmetry of the configuration, and is further delimited by two planes perpendicular to the z axis and located at height z(r) and z(r+$\delta$r), respectively.

The conservation (neglecting lost) of the optical flux involves that:

$$\int_{\theta=\alpha}^{\alpha+\delta\alpha}\int_{\rho=r}^{r+\delta r} K_{In}\, I_{In}(\rho,\theta)\, \rho\, d\rho\, d\theta = \int_{\theta=\alpha}^{\alpha+\delta\alpha}\int_{t=z(r)}^{z(r+\delta r)} K_{Out}\, I_{Out}(t,\theta)\, dt\, R_c\, d\theta \quad (1)$$

where $I_{In}(\rho,\theta)$ is the normalized irradiance distribution of the input beam while $I_{Out}(t,\theta)$ is the normalized irradiance distribution for the output beam measured on the reference cylinder with half-diameter $R_c$. Also, $K_{In}$ and $K_{Out}$ are the normalization constants respectively for the input and output irradiance distributions. Moreover, t is the variable along the z axis, $\theta$ is the azimuthal coordinate in the xy plane measured from the y axis, $\rho$ is the radial coordinate measured from the z axis and the value z(r) refer to the z coordinate at which an input ray located at a radial distance r from the z axis intersects the reference cylinder with half-diameter $R_c$.

In the case where irradiance distributions are independent of the angular coordinate $\theta$, the 2D problem is reduced to an 1D problem since the same angular term appears in both members of Eq. (1) and can thus be eliminated, leading to:

$$\frac{K_{In}}{K_{Out}R_c}\int_{\rho=r}^{r+\delta r} I_{In}(\rho)\, \rho\, d\rho = \int_{t=z(r)}^{z(r+\delta r)} I_{Out}(t)\, dt. \quad (2)$$

Figure 3:
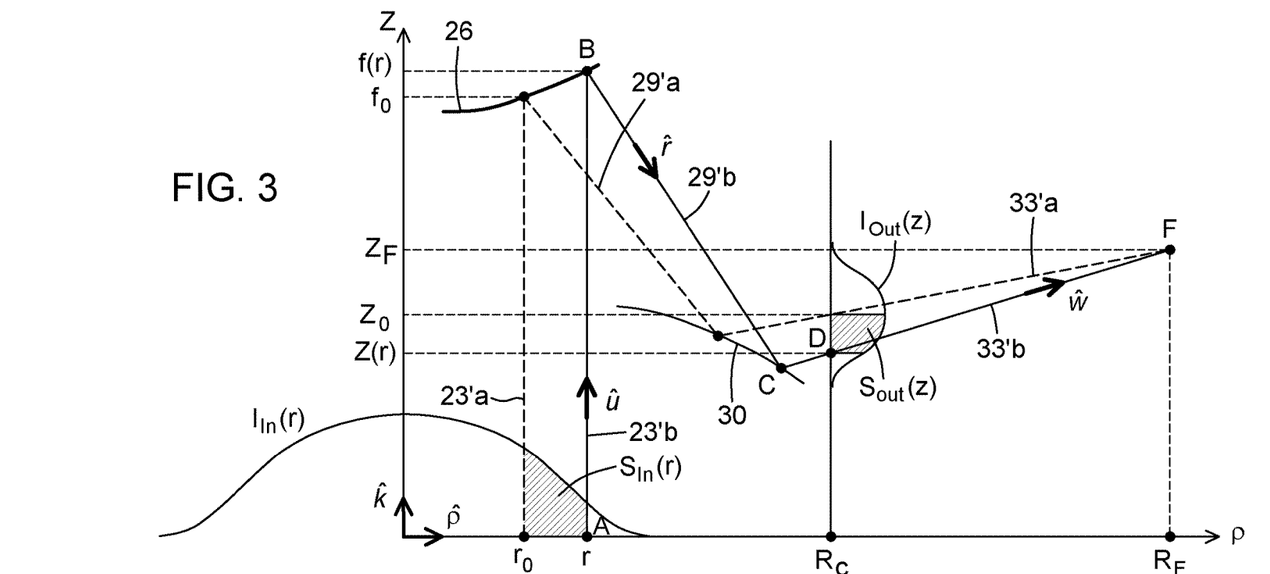
FIG. 3 illustrates in a radial plane the parameters of a Generic Ray Tracing (GRT) approach to determine the 2D profiles of the first and second reflective surfaces.
Figure 3A:
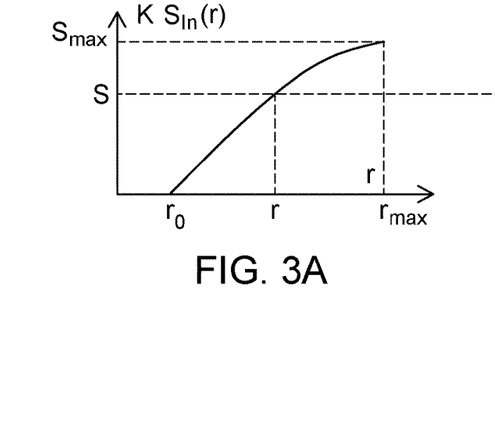
FIGS. 3A and 3B respectively show the variation of the parameters $KS_{In}$ and $S_{Out}$.
Figure 3B:
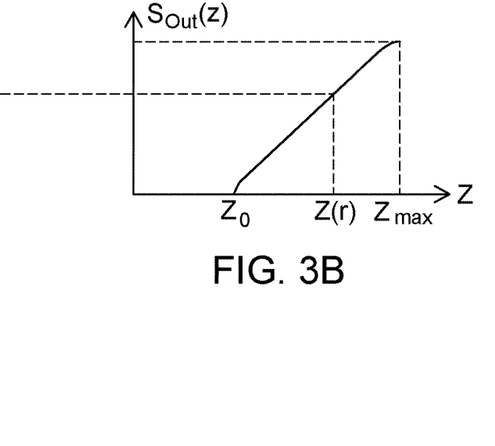

Let $z_o$ be the height on the reference cylinder corresponding to the center of the output irradiance profile $I_{Out}(t)$ and $r_o$ the radial position for the input rays whose trajectories pass at the center of the output profile. Then Eq. (2) can be rewritten as a cumulative integral starting at the center of the output profile.

$$\frac{K_{In}}{K_{Out}R_c}\int_{\rho=r_o}^{r} I_{In}(\rho)\, \rho\, d\rho = \int_{t=z_o}^{z(r)} I_{Out}(t)\, dt \quad (3)$$

which can be rewritten more simply as $$KS_{In}(r)=S_{Out}(z(r)) \quad (4)$$

where the constant K replaces $K_{In}/K_{Out}R_C$ while the functions $S_{In}$ and $S_{Out}$ replace the left and right cumulative integrals, respectively. $KS_{In}$ and $S_{Out}$ are shown on FIGS. 3A and 3B, respectively.

The design of the profiles of the first and second reflective surfaces relies on three basic principles: geometrical ray tracing, conservation of energy and equalisation of the optical paths.

The normalized profiles $I_{In}(r)$ and $I_{Out}(z)$ of both the input and output beams are known and the conservation of the energy allows the mapping of each input ray 23 into a uniquely defined output ray 33 and vice versa. This ray mapping is the starting step of the process. One approach for the computation of the ray mapping is illustrated on FIG. 3, which graphically represents light profiles and trajectories within a given radial plane $\rho$z. The input light ray 23'b with input radial coordinate r can be seen mapped to the output ray 33'b intersecting the reference cylinder at point D. From Eq. (4) above, it follows that the output light ray 33'b at point D has a z value for which $S_{Out}(z)$ is equal to K $S_{In}(r)$, or $$z(r)=S_{Out}^{-1}[KS_{In}(r)] \quad (5)$$

where $S^{-1}_{Out}(s)$ is the inverse of the function $S_{Out}(z)$. Analytic solutions for z(r) may exist for simple couples of input and output irradiance profiles. For more complex irradiance profiles, acceptable numerical approximations can be computed for the mapping z(r). The direction of the output ray 33'b is known from the coordinates (z(r),$R_c$), from the position of the focus and from the fact that the entire trajectory of the ray is contained in the radial plane $\rho$z.

In some embodiments, the approach for the design of the 2D profiles of the first and second reflective surfaces may involve the derivation of a mathematical model of the ray trajectories. Referring again to FIG. 3, one skilled in the art would understand that the unit vectors û and ŵ along the trajectories of ray 23'b, 33'b in the input and output spaces are both known. The unit vector r̂ of the trajectory of the transitional ray 29'b after the reflection of the input ray 23'b on the first reflective surface 26 is entirely determined by the incident vector û and the slope (or first derivative) of the profile of the first reflective surface 26 at the radial coordinate r of the input ray trajectory. Point C where the trajectory of the transitional ray 29'b hits the second reflective surface 30 is the intersection point of two lines defined by the point B with vector r̂ and point F with vector ŵ. All those elements depend on predetermined parameters and on the function z(r), on the z position f(r) of the intersection point B of the input ray 23'b with the first reflective surface 26 and on its first derivative df(r)/dr with respect to the radial coordinate. The optical path length is computed from the coordinates of the node points ABCDF on the ray trajectories, which is also a relation involving the functions z(r), f(r) and df(r)/dr and other predefined parameters. The ray trajectory model with the constraint that the optical path length be the same for all rays leads to a differential equation of the first order in f(r) that may be solved numerically or analytically.

Use of Optimization Process to Calculate the Profiles of the First and Second Reflective Surfaces In the GRT method, all the computations are deterministic. The computation of the solution can be done analytically or through a numerical process which is generally iterative. No implicit modelling through an optimization process is perform in this context.

In another implementation, a conventional optimization process may alternatively be used to obtain the 2D profiles of the first and second reflective surfaces. In that case, the reflective surfaces are both modeled by generic surfaces with their 2D profiles defined by a parametric equation. A set of sampled input rays is selected and the corresponding output trajectories are computed using Eq. (5). The trajectories of the sampled rays are computed in the actual optical system through ray tracing and the obtained output trajectories are compared with the desired output trajectories. The values of the parameters of the reflective surfaces are changed iteratively so as to minimize the differences between obtained output trajectories and desired output trajectories. Moreover, the optical path length from the input plane up to the focus cylinder is computed for each of the sampled rays and penalties are added to the optimization metric according to the optical path length differences between rays. Other constraints may be added to the optimization merit function to avoid conflicts with the two surfaces, obscuration of the input rays by the second surface, etc. Such a conventional optimization approach generally results in a solution with suitable approximate control of the trajectories and path lengths, provided that the process is started with an appropriate starting optical configuration. Errors in the trajectories and optical path differences can be typically small enough to be considered negligible.

Such a method may be considered as a guided exploration in a more or less vast family of possible configurations with the goal of identifying the configuration that best mimic the desired result. In the actual design problem, the possible configurations are all those obtained by combination of two reflective surfaces each mathematically defined by a parametric equation with a finite number of parameters (for example a conic section plus polynomial terms). The exploration is converted into an optimization problem aiming at the minimization of the metrics measuring the differences between the behaviors of the configuration with respect to the desired counterparts. The optimization process also eliminates unrealistic configurations through a set of constraints.

Optical Structures Embodying the Optical Component

The optical component may be embodied by various optical structures providing the desired light paths and reflective surfaces.

Figure 4:
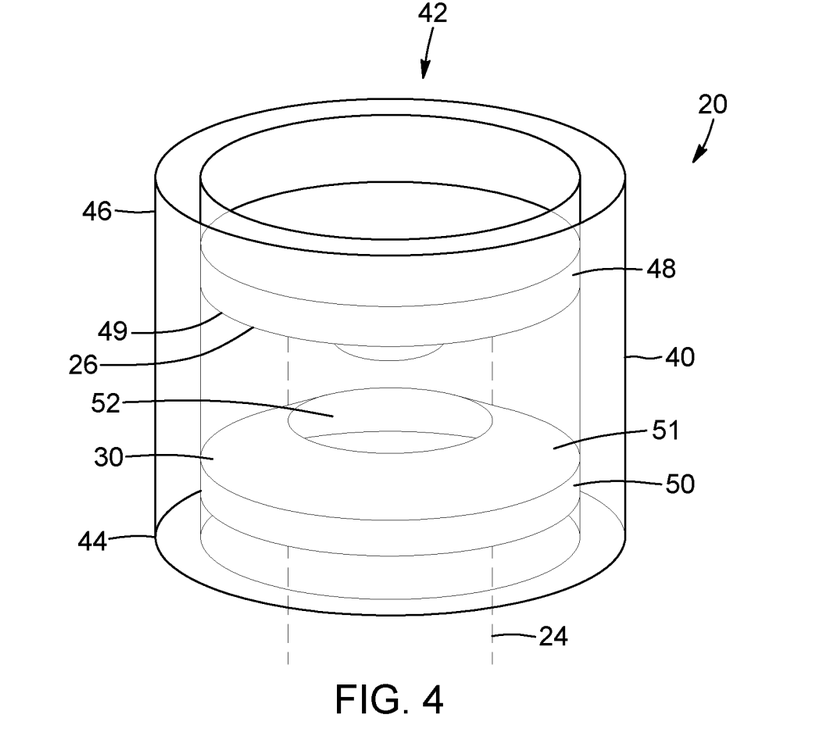
FIG. 4 is a side elevation transparent view of an optical structure embodying an optical component based on a hollow tube.

With reference to FIG. 4, there is shown one example of an optical structure embodying the optical component 20 as described herein. In some implementations, the optical element 20 may include a transparent hollow tube 40 having a longitudinal channel 42 allowing light propagation therein and therefore defining the input light path 24. The hollow tube 40 has a proximal portion 44 corresponding to the extremity that receives the input light beam, and a distal end 46 opposite to the proximal portion 44.

The optical structure defined by the optical component 20 in this embodiment includes a first optical element 48 extending inside the longitudinal channel in the distal portion 46 of the hollow tube 40, and having an inward face 49 defining the first reflective surface 26. For example, the first optical element 48 may be a mirror, and may be made of a disk, cylinder or otherwise shaped piece of glass, plastic or other suitable material having its inward surface 49 shaped according to the principles explained above and covered with a reflective material.

The optical structure defined by the optical component 20 in this embodiment further includes a second optical element 50 extending inside the longitudinal channel 42, in the proximal portion 44 of the hollow tube 40. The second optical element 50 has an inward face 51 defining the second reflective surface 30. Similarly to the first optical element 48, the second optical element 50 may be a mirror, and may be made of a disk, cylinder or otherwise shaped piece of glass, plastic or other suitable material having its inward surface 51 shaped according to the principles explained above and covered with a reflective material. It is of note that in the illustrated variant, the second optical element 50 further has a transparent central area 52 along the input light path 24. The transparent central area 52 allows transmission of the input light beam through the second optical element 50 so that it may reach the first optical element 48. The transparent central area 52 may for example be an opening machined through the second optical element 50. In cases where the structure supporting the reflective surface is made of a transparent material, the transparent central area 52 may alternatively be embodied by an area of the inward surface 51 that is free of any reflective material. It will be understood that the reference to a transparent material or area is meant to refer to the optical property of the area or material in question to allow light in the spectral range of the input light beam to propagate with low optical losses.

The first and second optical elements 48 and 50 preferably fit snuggly within the hollow tube 40. In some implementations, the first and second optical elements 48 and 50 may be cemented to the inner wall of the hollow tube 40. Shoulders (not shown) in the longitudinal channel 42 of the hollow tube 40 or on the optical elements 48, 50 can be used to facilitate the positioning of the optical elements 48, 50. In variants where the optical elements and the hollow tube are made of plastic, clips may be used to affix the optical elements 48, 50 within the hollow tube 40 without the need for cement.

Figure 5:
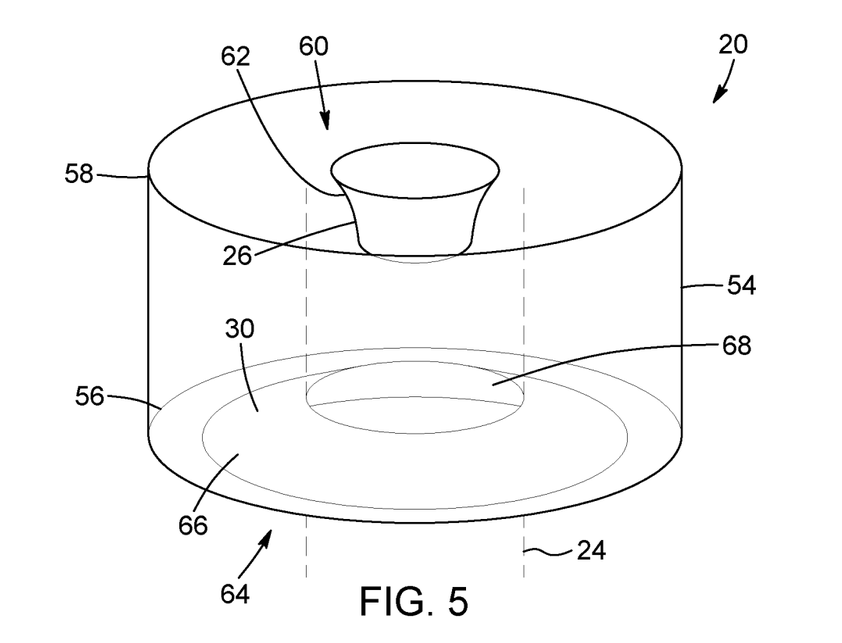
FIG. 5 is a side elevation transparent view of an optical structure embodying an optical component based on a solid transparent cylinder.

With reference to FIG. 5, there is shown another example of an optical structure embodying the optical component 20 as described herein. In such implementations, the optical element 20 may include a solid cylinder 54 made of a transparent material. The input light path 24 extends longitudinally along the symmetry axis of the solid cylinder 54. As mentioned above, by referring to the material of the solid cylinder 54 as transparent it is meant that light in the spectral range of the input light beam is allowed therethrough without substantial losses.

The solid cylinder 54 has a proximal portion 56 and a distal portion 58 corresponding to opposite longitudinal ends of the solid cylinder 54, the proximal portion 56 being defined by convention as the longitudinal end of the solid cylinder 54 receiving the input light beam. The distal portion 58 forms a first cavity 60 having a first cavity wall 62, and the proximal portion 56 forms a second cavity 64 having a second cavity wall 66. Layers of reflective material are provided over the first and second cavity walls 62 and 66, and define the first and second reflecting surfaces 26 and 30, respectively. The layer of reflective material provided along the second cavity wall 66 preferably forms a ring around the input light path 24, so that the input light beam may propagate through the central area 68 of the second cavity wall 66 for reflection on the first reflective surface 26.

Design considerations for the optical structure embodying the optical component may take into account refraction effects. For example, the embodiment of FIG. 4, involves refractions at the inner and outer surface of the hollow tube 40. Similarly, in the implementation of FIG. 5 the input beam can be refracted at the border edge of the optical structure. The impact of refraction can be added in the ray trajectories calculated through the GRT approach, which may involve more complex equations for the mathematical model of the ray trajectories. The refraction on the tube surfaces or at the exit of the monolithic device is not difficult to manage when the conventional optimization approach is used.

Referring to FIGS. 6A to 6D, there are shown different variants of optical components according to some implementations.

Figure 6A:
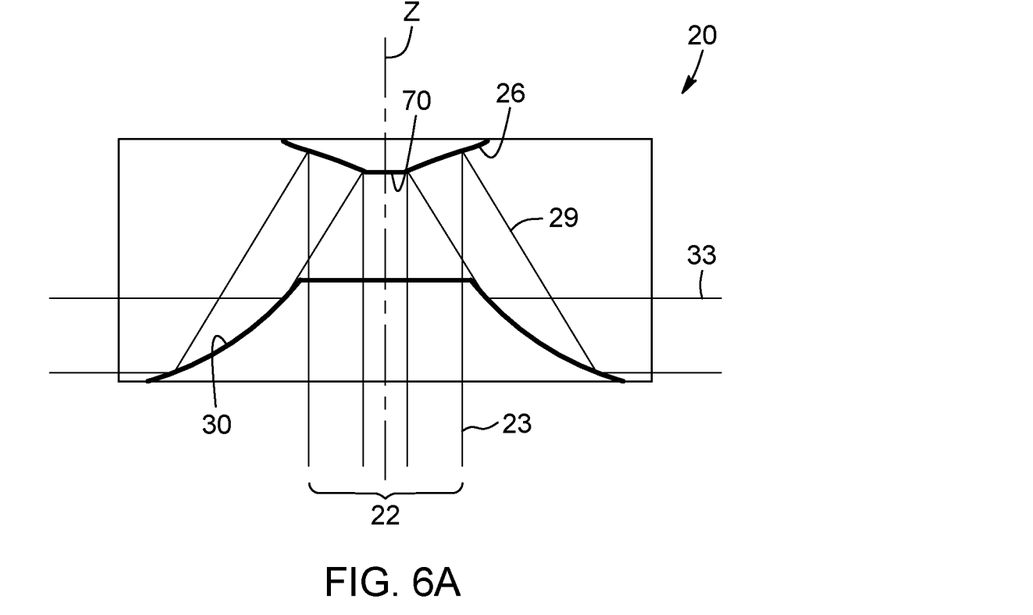
FIGS. 6A to 6D are cross-sectional illustrations of alternative configurations of optical components according to embodiments and showing the light paths therein.

FIG. 6A shows an optical component 20 having a geometry similar to the one illustrated in FIG. 5. In this variant, the first reflective surface 26 is defined by a ring-shaped mirror having the desired 2D profile and a flat center portion 70. As one skilled in the art will readily understand, the center part of the input beam 22 is truncated, which may cause diffraction of the central light rays at the edges of the first reflective surface 26. Diffraction artifacts can be reduced through an apodization of the reflectivity profile of the first reflective surface 26. Apodization allows the smoothing of the beam truncation which reduces the high-spatial-frequency content of the diffraction pattern. The apodization could be implemented by a control of the reflectivity of the mirror coating. In embodiments where the first reflective surface 26 includes a metallic reflective coating, the reflectivity may be controlled by adjusting the thickness of the thin metallic film deposited on the structure supporting the first reflective surface. The thickness of the metallic film is preferably reduced progressively around the effective zone to induce a progressive reduction of the reflectivity. Other manufacturing processes can be used to obtain the desired variation of reflectivity on the mirror surfaces for the implementation of the apodization.

Figure 6B:
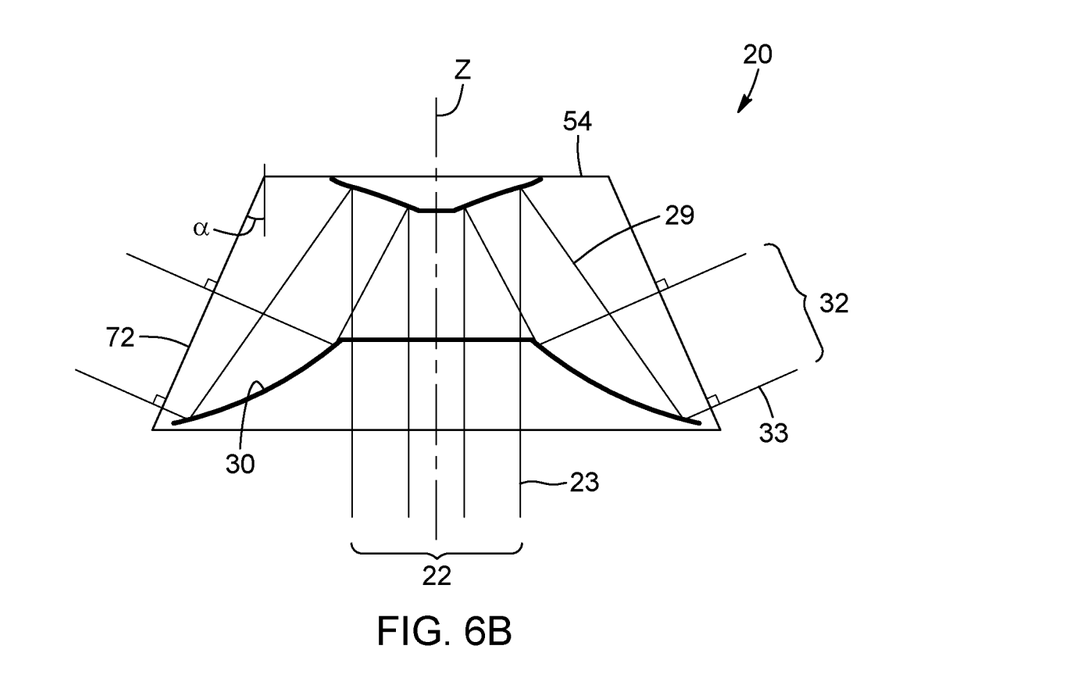

With reference to FIG. 6B, there is illustrated an example of a design where the output rays 33 do not propagate perpendicularly to the central axis z, so that the output light sheet 32 takes the form of a thin cone of light. The second reflective surface 30 in this embodiment is shaped so that the output light rays 33 project at the desired non-zero angle with respect to the xy plane, that is, a non-perpendicular angle with respect to the central optical axis z. In a monolithic implementation, the solid cylinder 54 has a lateral wall 72 which extends at a right angle with respect to the output rays 33 impinging thereon. The resulting optical component 20 is therefore frustro-conically shaped with the profile of the solid cylinder 54 forming an isosceles trapezoid having its larger base at the proximal end. Such a configuration ensures that the output rays exit the solid cylinder without being deviated at the optical interface with the surrounding environment defined by the lateral wall 72 of the solid cylinder 54.

Figure 6C:
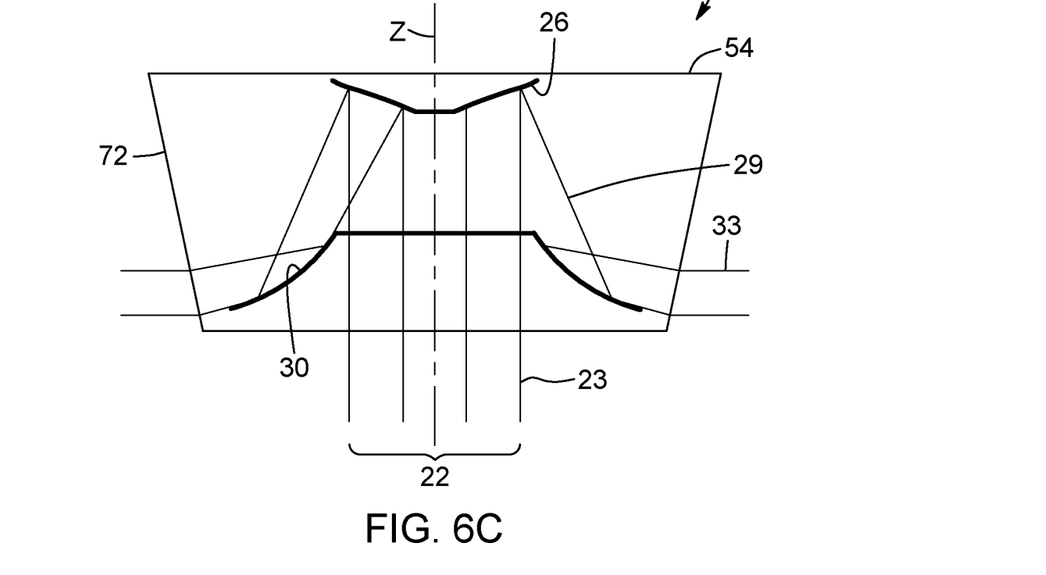

Referring to FIG. 6C, there is shown yet another variant of an optical structure embodying the optical component 20. In this design variation, the lateral wall of the solid cylinder 54 extends at a non-normal angle with respect to the output rays 33 of the output light sheet 32. This non-normal angle is preferably selected so that the output light rays 33 are redirected along propagation directions perpendicular to the central optical axis z by refraction at the optical interface formed by the lateral wall 72. The resulting optical component 20 is therefore frustro-conically shaped with the profile of the solid cylinder 54 forming an isosceles trapezoid having now its larger base at the distal end. The design produces a thin output light sheet 32 which spreads within a nominal plane perpendicular to the central axis z, as for the case of the embodiment of FIG. 6A. The embodiment of FIG. 6C is more complex but it offers the possibility of being manufactured through injection molding processes, which is not necessarily the case for the simple configuration of FIG. 6A due to the vertical wall of its exit interface. The angle of the lateral wall 72 can also be chosen for the emission of a thin cone of light as in the embodiment of FIG. 6B, but with the lateral wall not at right angle with respect to the output rays 33.

Figure 6D:
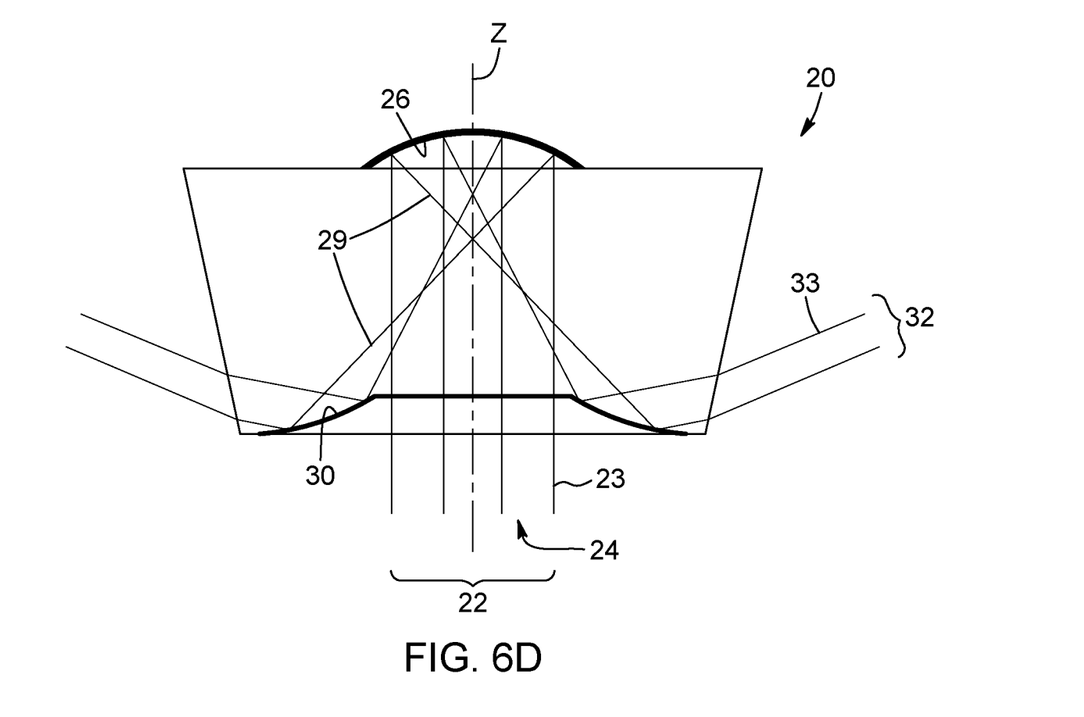

With reference to FIG. 6D, there is shown another optical structure according to one embodiment. In this case, the optical component 20 for transforming an input light beam 22 having a Gaussian irradiance distribution into an output light sheet 32 again has an input light path 24 defining a central optical axis z and configured for propagation of the input light beam 22 therealong. The first reflective surface 26 extends around the central optical axis z and across the input light path 24 so as to reflect input light rays 23 of the input light beam 22 into transitional light rays 29 that cross the central optical axis z. The second reflective surface 30 extends around the central optical axis z and across a light path of the transitional light rays 29 so as to reflect the transitional light rays 29 outwardly into output light rays 33 defining said output light sheet 32. As in previous embodiments, the first and second reflective surfaces 26 and 30 are configured to distribute optical power within the output light sheet 32 according to a Gaussian irradiance distribution transversally to the output light sheet 32. As will be readily understood by one skilled in the art in such a configuration the first surface 26 reflects the input light beam 22 inwardly in a "cross-beam" configuration prior to reaching the second reflective surface 30.

Figure 7:
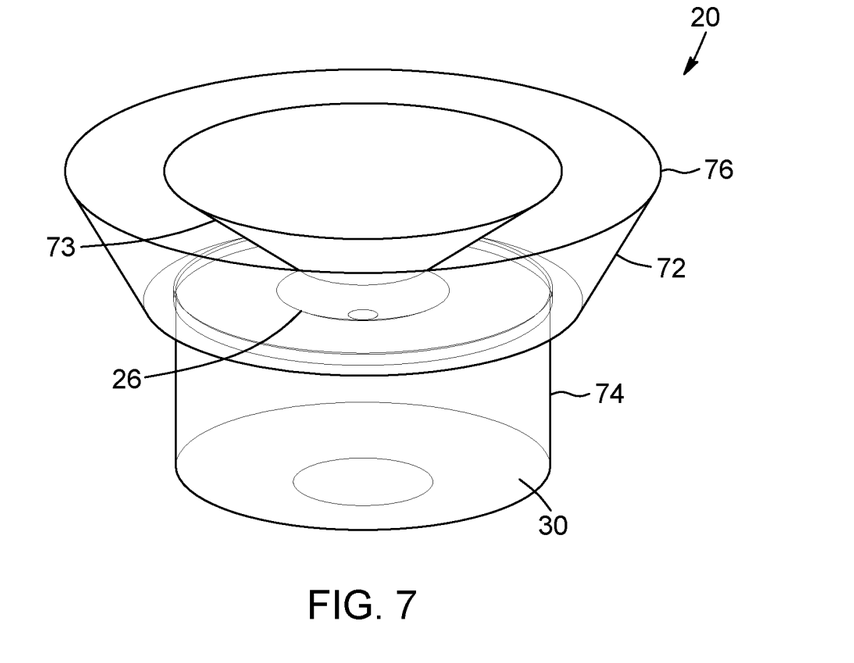
FIG. 7 is a side elevation transparent view of an optical component based on assembled input and output optical structures according to an embodiment.
Figure 7A:
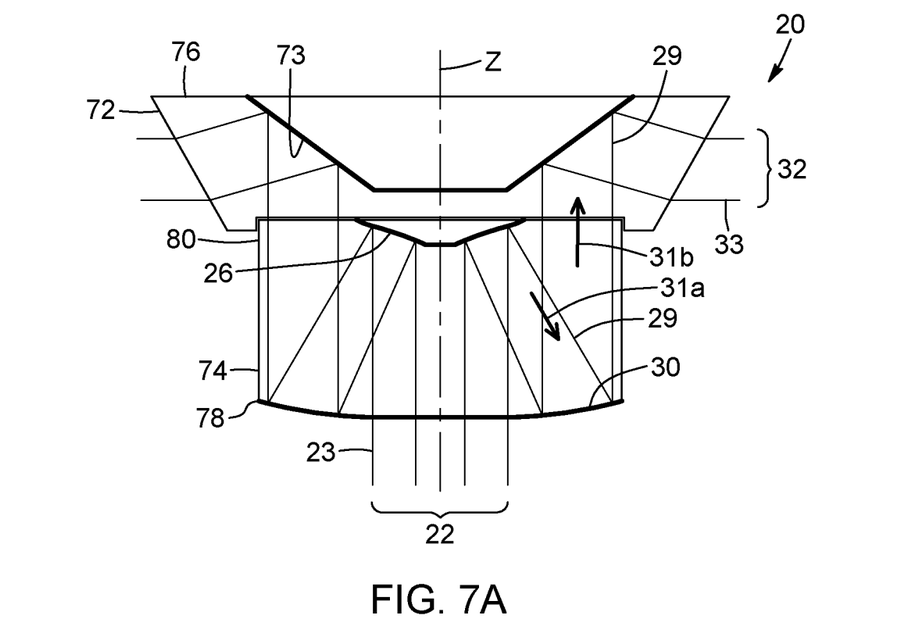
FIG. 7A is a cross-sectional illustration of the optical component of FIG. 7, showing the light paths therein.

With reference to FIGS. 7 and 7A, there is shown another implementation of an optical component 20 for transforming an input light beam 22 having a Gaussian irradiance distribution into an output light sheet 32.

In this embodiment, the optical component includes a third reflective surface 73 acting in concert with the first and second reflective surfaces 26 and 30 to produce the output light sheet 32. The second reflective surface 30 extends around the central optical axis z and across a first light path 31a of the transitional light rays 29, and reflects these transitional light rays 29 along a second light path 31b projecting concentrically to the input light beam and clear of the first reflective surface 26. As best seen in FIG. 7A, the transitional light cone reflected off the first reflective surface 26 is again reflected back in the same direction as the input light beam 22 parallelly to the central optical axis z. The second light path 31b leads the transitional light rays 29 to the third reflective surface 73. The third reflective surface 73 extends around the central axis z and across the second light path 31b. The transitional light rays 29 are reflected outwardly into output light rays 33 defining the output light sheet 32.

In the illustrated embodiment of FIGS. 7 and 7A, the optical component includes an input optical structure 74 and an output optical structure 76. The input optical structure 74 having a proximal portion 78 for receiving the input light beam 22 and a distal portion 80 opposite to the proximal portion 78. The first reflective surface 26 extends across the distal portion 80 facing towards the proximal portion 78, and the second reflective surface 30 extends across the proximal portion 78 facing towards the distal portion 80. The output optical structure 76 supports the third reflective surface 73 and is affixed to the distal portion 80 of the input optical structure 74.

Preferably, the input and output optical structures 74 and 76 are monolithic transparent blocks. They can be assembled and affixed to one another in a variety of manners, such as for example through soldering, with a layer of adhesive at their respective interfaces, held together with a clamp or through any other external fastener. An air gap may in some variants be provided between the two optical structures.

As will be readily understood by one skilled in the art, in the illustrated embodiment the input optical structure 74 ensures the transformation of the input Gaussian beam into an annulus of collimated rays (propagating parallel to the input beam axis) with a Gaussian irradiance profile. The third reflective surface 73 forms a truncated cone in the center of the output optical structure 76 that reflects the rays toward the lateral wall 72 to produce a thin sheet of rays, similarly to the simple configuration of FIG. 6A. This embodiment may also be adapted to generate a cone of light such as obtained in the configuration of FIG. 6B. Tilted walls can be used to make possible the manufacture of the structures 74 and 76 through injection molding processes.

In FIGS. 6A to 6D and FIG. 7A, the output beams are all focused at an infinite distance from the optical axis, but variants with finite distance focusing are also possible for all the embodiments including those shown on the figures.

As will be readily understood by one skilled in the art, other variants of the optical component according to the present description may include characteristics and configurations differing from those presented herein. By way of example, in some configuration the first surface may reflect the input light beam inwardly in a "cross-beam" configuration prior to reaching the second mirror.

Of course, numerous modifications could be made to the embodiments above without departing from the scope of the invention as defined in the appended claims.

The invention claimed is:

1. An optical component for transforming an input light beam having a Gaussian irradiance distribution into an output light sheet, comprising:
   an input light path defining a central optical axis and configured for propagation of the input light beam therealong;
   a first reflective surface extending around the central optical axis and across the input light path so as to reflect input light rays of the input light beam into transitional light rays defining a transitional light cone; and
   a second reflective surface extending around the central optical axis and across a light path of the transitional light cone so as to reflect the transitional light rays outwardly into output light rays defining said output light sheet, the output light rays radially expanding over 360° along a plane or a cone, the output light sheet having a thickness in a direction perpendicular to a propagation direction of each output light ray;
   wherein the first and second reflective surfaces are configured to distribute optical power within the output light sheet according to a Gaussian irradiance distribution across the thickness of the output light sheet at any radial position along a path of said output light sheet.

2. The optical component according to claim 1, wherein each of the first and second reflective surfaces has a shape defined by a two-dimensional profile in a plane including the central optical axis and a symmetry of revolution about said central optical axis.

3. The optical component according to claim 2, wherein the two-dimensional profiles of the first and second reflective surfaces stem from a modeling of the trajectories of the input, transitional and output light rays through the optical component.

4. The optical component according to claim 2, wherein the two-dimensional profiles of the first and second reflective surfaces stem from analytical or numerical solutions to differential equations relating said two-dimensional profiles to trajectories of the input, transitional and output light rays through the optical component.

5. The optical component according to claim 2, wherein the two-dimensional profiles of the first and second reflective surfaces stem from solutions, obtained through an optimization process, to parametric equations relating said two-dimensional profiles to trajectories of the input, transitional and output light rays through the optical component.

6. The optical component according to claim 1, wherein the first or second reflective surface has an apodizing reflectivity profile.

7. The optical component according to claim 1, wherein the output light sheet projects perpendicularly to the central optical axis.

8. The optical component according to claim 1, wherein the output light sheet projects at a non-normal angle with respect to the central optical axis.

9. The optical component according to claim 1, comprising an optical structure having a proximal portion and a distal portion opposite the proximal portion, the first reflective surface extending across the distal portion facing towards the proximal portion, and the second reflective surface extending across the proximal portion facing towards the distal portion.

10. The optical component according to claim 9, wherein the optical structure comprises:
    a hollow tube comprising said proximal portion and said distal portion and having a longitudinal channel defining the input light path;
    a first optical element extending inside the longitudinal channel in the distal portion of the hollow tube, the first optical element having an inward face defining the first reflective surface;
    a second optical element extending inside the longitudinal channel in the proximal portion of the hollow tube, the second optical element having an inward face defining the second reflective surface, the second optical element further having a transparent central area along the input light path.

11. The optical component according to claim 10, wherein the first and second optical elements are mirrors.

12. The optical component according to claim 9, wherein the optical structure comprises a solid cylinder made of a transparent material, the input light path extending longitudinally through said solid cylinder, said solid cylinder having a lateral wall traversed by the output light sheet.

13. The optical component according to claim 12, wherein said proximal portion and said distal portion correspond to opposite longitudinal ends of the solid cylinder, the distal portion forming a first cavity having a first cavity wall, the proximal portion forming a second cavity having a second cavity wall.

14. The optical component according to claim 13, further comprising:
    a first layer of reflective material provided along the first cavity wall and defining the first reflecting surface; and
    a second layer of reflective material provided along the second cavity wall and defining the second reflecting surface, the second layer of reflective material forming a ring around the input light path.

15. The optical component according to claim 12, wherein the lateral wall of the solid cylinder is cylindrically shaped.

16. The optical component according to claim 12, wherein the lateral wall of the solid cylinder is frustro-conically shaped.

17. The optical component according to claim 12, wherein the lateral wall of the solid cylinder extends at a right angle with respect to the output light rays of the output light sheet.

18. The optical component according to claim 12, wherein the lateral wall of the solid cylinder extends at a non-normal angle with respect to the output light rays of the output light sheet.

19. The optical component according to claim 18, wherein said non-normal angle is selected so that the output light rays are redirected along a propagation direction perpendicular to the central optical axis by refraction through the lateral wall.

20. An optical component for transforming an input light beam having a Gaussian irradiance distribution into an output light sheet, comprising:
- an input light path defining a central optical axis and configured for propagation of the input light beam therealong;
- a first reflective surface extending around the central optical axis and across the input light path so as to reflect input light rays of the input light beam into transitional light rays defining a transitional light cone;
- a second reflective surface extending around the central optical axis and across a first light path of the transitional light rays so as to reflect said transitional light rays along a second light path projecting concentrically to the input light beam and clear of the first reflective surface;
- a third reflective surface extending around the central axis and across the second light path of the transitional light rays so as to reflect the transitional light rays outwardly into output light rays defining said output light sheet, the output light rays radially expanding over 360° along a plane or a cone, the output light sheet having a thickness in a direction perpendicular to a propagation direction of each output light ray;
- wherein the first and second reflective surfaces are configured to distribute optical power within the output light sheet according to a Gaussian irradiance distribution across the thickness of the output light sheet at any radial position along a path of said output light sheet.

21. The optical component according to claim 20, comprising:
- an input optical structure having a proximal portion and a distal portion opposite the proximal portion, the first reflective surface extending across the distal portion facing towards the proximal portion, and the second reflective surface extending across the proximal portion facing towards the distal portion; and
- an output optical structure supporting the third reflective surface and affixed to the distal portion of the input optical structure.

22. The optical component according to claim 21, wherein the input and output optical structures are monolithic transparent blocks.

23. An optical component for transforming an input light beam having a Gaussian irradiance distribution into an output light sheet, comprising:
- an input light path defining a central optical axis and configured for propagation of the input light beam therealong;
- a first reflective surface extending around the central optical axis and across the input light path so as to reflect input light rays of the input light beam into transitional light rays that cross the central optical axis; and
- a second reflective surface extending around the central optical axis and across a light path of the transitional light rays so as to reflect the transitional light rays outwardly into output light rays defining said output light sheet, the output light rays radially expanding over 360° along a plane or a cone, the output light sheet having a thickness in a direction perpendicular to a propagation direction of each output light ray;
- wherein the first and second reflective surfaces are configured to distribute optical power within the output light sheet according to a Gaussian irradiance distribution across the thickness of the output light sheet at any radial position along a path of said output light sheet.

* * * * *